Inventors
IRA D. MAXON, MAX SKLOVSKY
& WILLARD H. NORDENSON

Patented Jan. 25, 1944

2,340,134

UNITED STATES PATENT OFFICE 2,340,134

TRACTOR

Ira D. Maxon, Max Sklovsky, and Willard H. Nordenson, Moline, Ill., assignors to Deere & Company, Moline, Ill., a corporation of Illinois Original application November 5, 1937, Serial No. 172,906. Divided and this application January 5, 1942, Serial No. 425,634

12 Claims. (Cl. 180—75)

The present invention relates to farm tractors and the like, with particular reference to tractors of the type used for cultivating a single row of crops, and is a division of a co-pending application, Serial No. 172,906, filed November 5, 1937, by Maxon, Sklovsky and Nordenson.

The principal object of the present invention relates to the provision of a tractor having a novel and improved power transmitting connection from the differential gears to the propelling wheels, which connection is comparatively simple in design and therefore comparatively inexpensive to manufacture, but without sacrifice of strength and durability. More specifically, it is an object of the present invention to provide a rear axle structure of the type having depending final drive housings for the purpose of maintaining the rear axle housing in an elevated position to clear a row of crops beneath the center line of the tractor, and has to do with the provision of a final drive mechanism that is comparatively simple but strong, and is readily accessible for purposes of quick assembly and disassembly.

An additional object of this invention is the provision of a tractor in which the transmission and differential units are mounted in the same housing, which housing is secured to and supported in an improved manner in the rear axle housing. It is also an object to provide a full floating rear axle construction in which the rear axle drive shafts are slidably connected, both with the differential unit of the rear axle and also with the driving connections to the traction wheels, whereby stresses due to any structural distortion of the tractor frame are not transmitted to either the differential gears or the other parts making up the driving train. A further object is concerned with the provision of a single member which serves both as a differential brake drum and also as part of the full floating connection between the axle shafts and the traction wheel driving means. A related object has to do with locating the differential brake elements within the final drive housings in a position which is well protected from dirt and damage, but which is easily accessible after the final drive housing is dismounted. Still another object relates to the provision of a final drive housing from which the gear on the wheel axle is readily removable, without the necessity of dismounting the housing from the tractor.

It is a further object of the present invention to make it possible for the operator to view the crop row beneath the center of the tractor, while seated in a normal sitting position in the operator's seat. In the accomplishment of this object, the differential gear mechanism is offset to one side of the center line of the tractor, together with the transmission shaft and tractor engine, while the transmission shaft is covered with an enclosure which is so narrow that, with the shaft disposed in offset relation, the enclosure is entirely to one side of the center line, whereby the operator is able to look past the enclosure to watch the action of cultivating tools upon the row of plants beneath the center line of the tractor.

These and other objects and advantages of the present invention will be apparent to those skilled in the art after a consideration of the following detailed description of the preferred embodiment of the invention, taken in conjunction with the accompanying drawings illustrating such embodiment.

Figure 1:
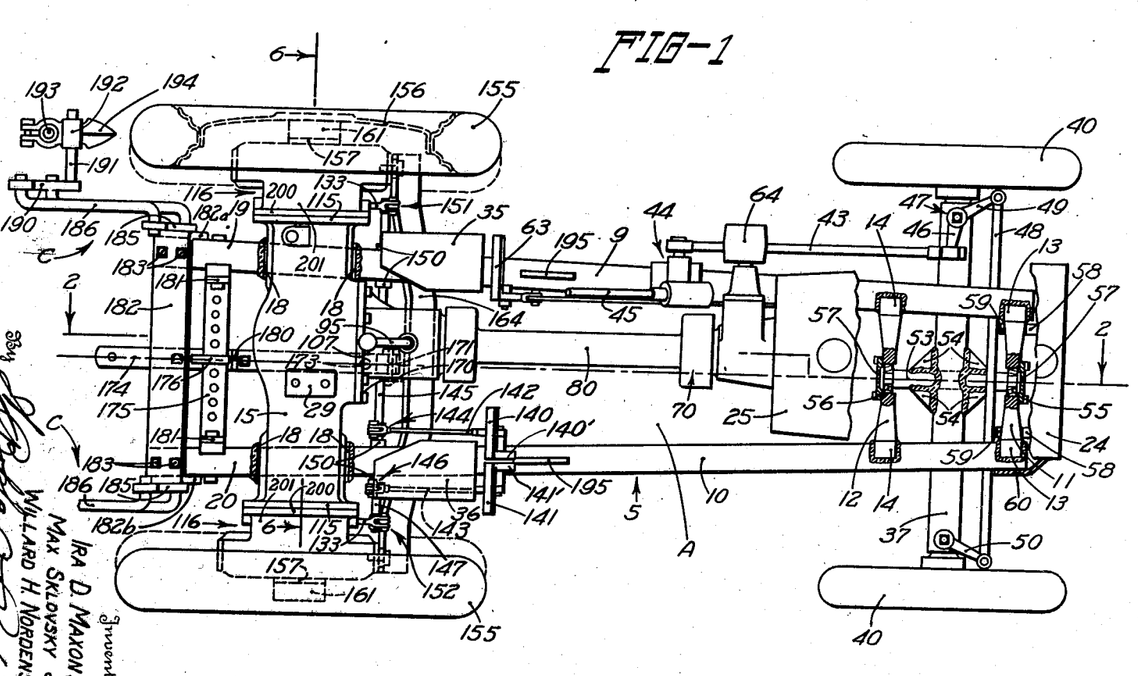
Figure 1 is a plan view of a tractor embodying the principles of the present invention, certain parts being broken away in order to show better the construction with which the present invention is principally concerned.
Figures 2, 3:
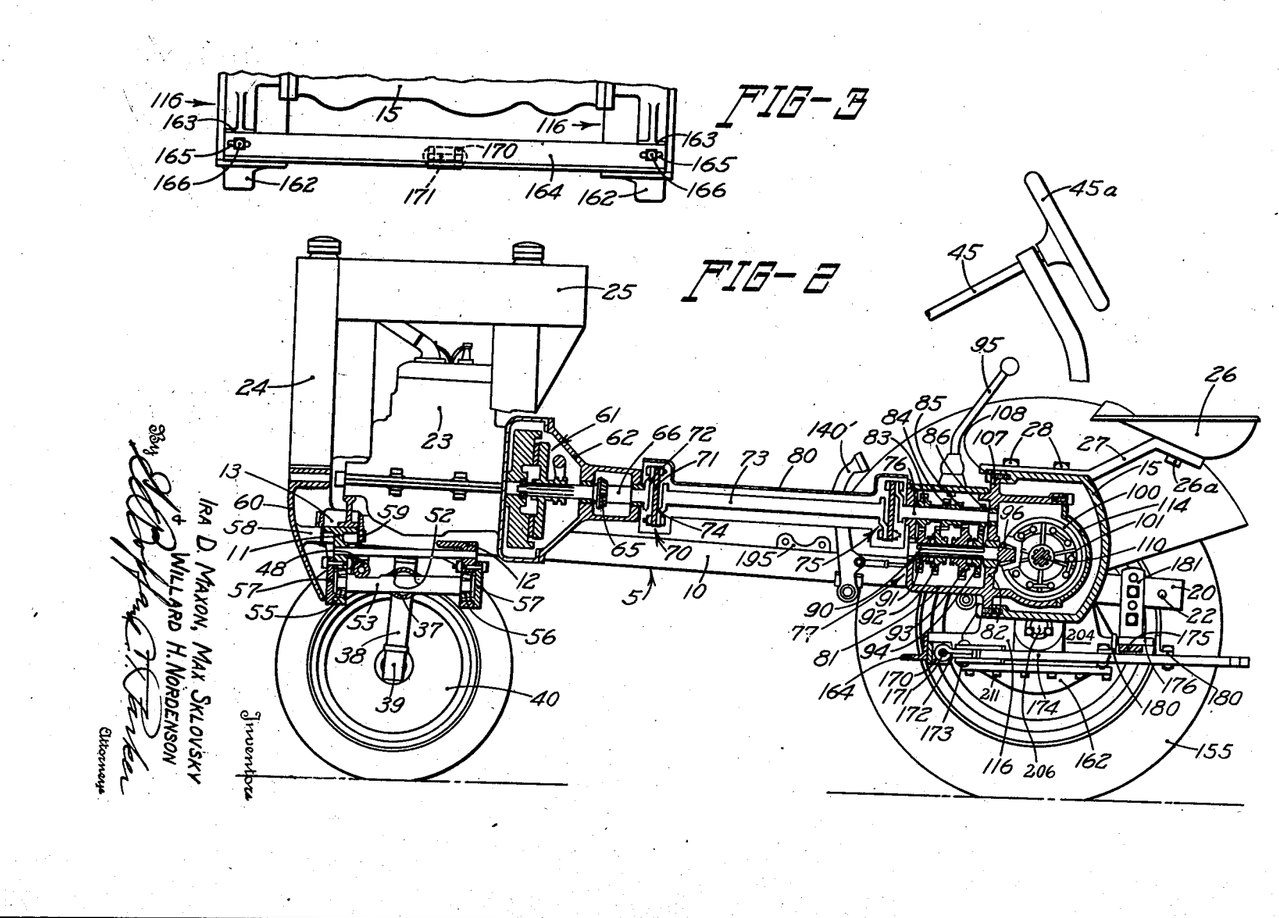
Figure 2 is a partial sectional view taken along the line 2—2 of Figure 1.
Figure 3 is a fragmentary view, taken on the under side of the tractor and looking rearwardly at the drawbar frame.
Figures 4, 5:
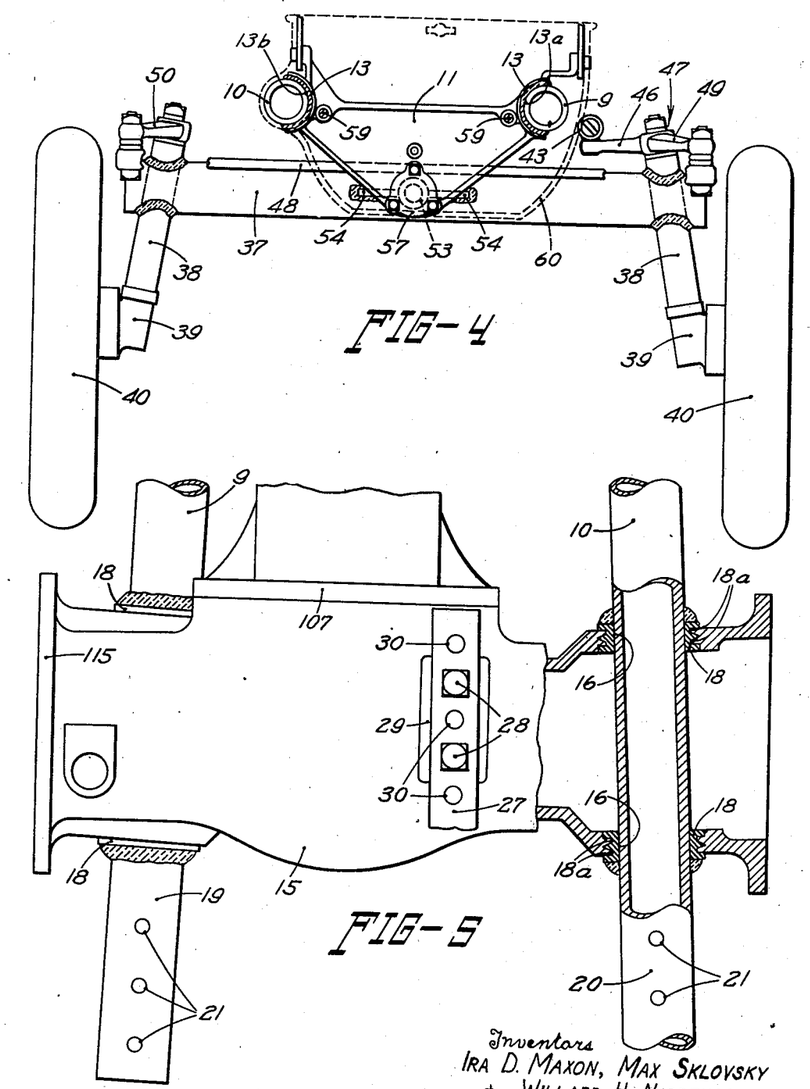
Figure 4 is an enlarged front view showing the front axle with the plant guiding apron casting removed.
Figure 5 is an enlarged plan view of the rear axle banjo housing, parts being broken away to show the manner of securing a welded connection between the tubular frame members and the cast iron banjo housing.

Referring now more particularly to Figures 1 and 2, the frame of the tractor is indicated in its entirety by the reference numeral 5 and comprises two laterally spaced generally longitudinally extending tubular steel members 8 and 10 converging slightly toward their forward ends and connected at the front by a cast steel cross member 11 (Figures 1 and 4). The member 11 is substantially triangular in shape and has brackets 13 at the outer ends which are formed with openings or recesses 13a and 13b in which the forward ends of the frame members 9 and 10 are disposed and to which they are welded. A second cast steel cross member 12 is disposed rearwardly of the cross member 11, and is also provided with brackets 14 at its outer ends which are of practically the same formation as the brackets 13 described above and to which the forward portions of the frame members 9 and 10 are welded. These cross members or castings 11 and 12 serve as rigid parts of the frame 5 receiving the front axle assembly connections, as will be described below.

Figure 6:
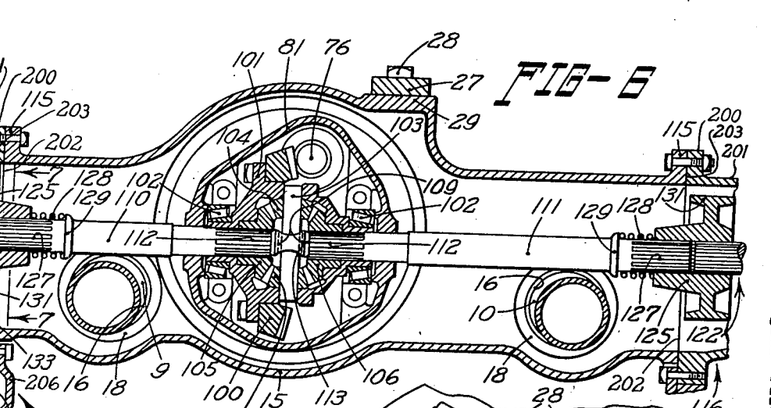
Figure 6 is a transverse vertical section taken through the rear axle housing assembly, generally along the line 6—6 of Figure 1.

At the rear end of the frame 5 the tubular frame bars 9 and 10 extend through and beyond a cast iron axle housing 15 of the banjo type, which is best shown in Figure 5. Preferably, although not necessarily, the frame bars 9 and 10 extend through openings 16 formed in the front and rear wall sections of the rear axle housing generally below the center line thereof (Figure 6). Preferably, the tubular frame members 9 and 10 are formed of steel tubing, while the rear axle housing 15 is formed of cast iron. According to the present invention, to secure a rigid and reliable weld in fastening the frame bars 9 and 10 to the rear axle housing, steel collar inserts 18, which have the same inside diameter as the outside diameter of the tubular frame members 9 and 10, are cast in proper position in the rear axle housing at the same time that the latter is cast.

Preferably the rear end portions of the tubular frame members 9 and 10 extend through the axle housing and rearwardly thereof, as at 19 and 20, so as to provide a novel means for attaching cultivator rigs and other implements or tools to the tractor. The end portions 19 and 20 are provided with a number of vertically and horizontally disposed holes 21 and 22 providing means for securing implement draft frames and the like to the rear end of the tractor.

A suitable power plant, such as a two cylinder gasoline motor 23, is carried on the forward end of the frame 5, and forward of the motor 23 the frame carries a radiator 24, and above the motor 23 is a fuel tank 25. At the rear of the tractor frame an operator's seat 26 is bolted, as at 26a in Figure 2, to a seat bar 27 which is bolted, as at 28, to a boss 29. The forward end of the seat bar 27 is provided with a number of openings 30 formed in the seat bar in properly spaced relation so as to provide for adjusting the seat 26 fore and aft so as to bring the operator to the proper position. Fixed to the tubular frame members 9 and 10 a short distance forwardly of the rear axle housing 15 are two foot-rest platforms 35 and 36, as best shown in Figure 1. From this figure it will be seen that the motor, the radiator, the fuel tank, and the propeller shaft, to be described later, are all offset slightly to the left of the tractor, while the operator's station or seat on the tractor is disposed slightly to the right. This particular construction materially improves the visibility from the operator's seat for steering the tractor while cultivating, it being seen from Figure 1 that there is an unobstructed area A (Figure 1) of substantial extent through which the operator can view the plants being cultivated or the ground being traversed. The operator is thus able to look past the propeller shaft enclosure and watch the action of cultivating tools upon the row of plants beneath the center line of the tractor, while sitting in a normal sitting position without the necessity for leaning over or craning his neck.

The front wheel supporting structure is best shown in Figures 1, 2 and 4, and comprises a transversely disposed steel pipe member 37, the outer ends of which have generally vertically aligned apertures through which extend smaller tubular steel members 38 that are arranged generally vertically, as best shown in Figure 4. The vertical tubular members 38 are set at a slight angle to the perpendicular in order to provide the correct steering geometry for the tractor, and are welded to the front transverse tubular member 37 along their lines of intersection therewith at both the top and bottom, thereby providing an extremely rigid structure. The vertical members 38 extend downwardly for a considerable extent below the transverse tube 37 and receive the king-pins 39 that support the front wheels 40 on the tractor. A drag link 43 extends forwardly from a worm and sector mechanism 44 that is actuated by the steering shaft 45 to which a steering wheel 45a is fixed at its upper end. The forward end of the drag link 43, as best shown in Figure 1, is pivotally connected to the arm 46 of a bell crank lever 47 that is fixed to the upper end of the left wheel king pin 39. A tie rod 48 extends transversely of the tractor forward of and adjacent the upper edge of the front axle tube 37, and at one end the tie rod 48 is connected to the other arm 49 of the bell crank 47 while the other end of the tie rod 48 is pivoted to an arm 50 that is fixed to the upper end of the right wheel king-pin. From Figure 4 it will be particularly noted that the front end construction of the tractor constructed according to the principles of the present invention is especially adapted to pass over plants and the like and has no projecting parts, braces, radius rods, and the like, which would tend to catch the stalks. Instead, the use of pipe members provides smooth rounded surfaces under which the plants can pass without becoming entangled. The tie-rod 48 is disposed in an upper position with respect to the front axle tube 37 so that there is little danger of the part 48 catching stalks, plants and the like.

The tractor is supported on the front axle assembly substantially at the mid-point of the front axle tube 37. Substantially at its central portion the member 37 is provided with longitudinally aligned openings 52 in which a longitudinally extending tube 53 is disposed, the parts 37 and 53 being securely welded together along the lines of intersection. Triangular gusset plates 54 are welded between the two tubular members 37 and 53 so as to provide the required lateral rigidity. The longitudinal tubular member 53 is supported at its forward end in the central opening in the steel casting 11, and at its rear end the tubular member 53 is supported in the rear steel casting 12. Suitable bearings 55 and 56 are disposed in the central openings in the castings 11 and 12 and receive the tubular member 53 for rocking movement about a longitudinal axis. Preferably, the bearings 55 and 56 are of the pre-loaded type, these bearings being pre-loaded at the time of assembly by means of front and rear bearing caps 57 which have shoulders that bear against the outer races of the bearings the inner races of which bear against shoulders provided in any suitable manner on the ends of the longitudinal member 53. Shims are placed under the bearing caps 57 so that when the bearing caps are tightened up against the transverse castings 11 and 12, the bearings will be placed under an initial thrust load so as to eliminate any slack while providing for free lateral rocking movement of the front axle assembly relative to the tractor. Fore and aft rigidity is, however, maintained without requiring any radius rods or other braces which would obscure the view of the crop rows from the tractor seat.

A bumper apron 60, preferably although not necessarily, made of cast iron is bolted to the front end of the frame by cap screws 59 inserted through aligned apertures in the cross member 11 and in bosses 58 raised on the inner surface of the apron 60, and continues the line of the radiator down under the tractor, as best shown in Figure 2, thereby guiding the tops of tall plants down under the tractor without breaking the stalks or otherwise injuring them. It will be noted that the apron strikes the plants high on the stalks where they are most flexible, bending them gently downwardly so as to clear the front axle.

The drive from the motor comprises a clutch 61 that is carried in a clutch housing 62, and the clutch 61 is operated by means of a clutch pedal 63 that is mounted on the left hand frame member 9 immediately forward of the foot-rest platform 35. Immediately rearwardly of the clutch is a belt pulley takeoff 64 that is driven by any suitable connection with a bevel gear 65 that is mounted on the shaft 66 that is driven when the clutch 61 is engaged. The rear end of the shaft 66 has a flexible coupling 70 that comprises a disk 71 of flexible material connected to the shaft 66 by means of three fingers 72 and to a propeller shaft 73 by three fingers 74 that are spaced angularly from the driving fingers 72. A second flexible coupling 75 is disposed at the rear end of the propeller shaft 73 and is substantially the same as the flexible coupling 70 just described. The coupling 75 operates the driving shaft 76 of the tractor transmission 77. A hood 80 extends the length of the propeller shaft 73, and at its ends covers the two flexible couplings 70 and 75. The hood 80 is sufficiently narrow, as is evident from the drawings, that in its offset position, is disposed entirely to the left of the center line of the tractor along its intermediate portion, and thus does not interfere with the operator's line of vision of the row of plants under the center of the tractor.

Both the transmission and the differential are carried in a single housing 81 which is divided by a wall 82 into a front transmission compartment and a rear differential compartment. The transmission of the tractor comprises the main shaft 76 mentioned above and on which four driving pinions 83, 84, 85 and 86 are fixedly mounted. In the lower portion of the transmission compartment, a splined driven shaft 90 is disposed parallel to the transmission shaft 76. Four driven gears 91, 92, 93 and 94 are carried on the driven shaft 90, the gears 92 and 93 being mounted for sliding movement, and are provided with clutch teeth that are adapted to engage similar clutch teeth formed on the gears 91 and 94 adjacent the front and rear portions of the transmission compartment. The gears 92 and 93 are provided with suitable grooves which receive suitable shifting forks controlled by a gear shift lever 95. The gears 91 and 94 are free to turn on the driven shaft 90, and the gear 91 runs in constant mesh with the companion driving pinion 83 on the driving shaft 76. The rear gear 94 is in constant mesh with its driving pinion 86 through a reverse idler gear (not shown). The gears 91 and 94 have companion clutch teeth with which the clutch teeth on the shiftable gears 92 and 93 are adapted to engage for the purpose of locking the selected gear to the shaft 90. Thus, the gear 92 may be moved into engagement with either the pinion 84 or the gear 91, and the gear 93 may be moved into engagement with either the pinion 85 or the gear 94. The driven transmission shaft 90 extends rearwardly through the dividing wall 82 and into the differential compartment. A bevel pinion 96 is fixed to the rear end of the transmission driven shaft 90.

The differential unit that is disposed within the differential compartment of the common housing 81 is generally of conventional design. A ring gear 100, with which the driving bevel pinion 96 meshes, is fixed in any suitable manner to a differential pinion frame 101 (Figure 6) which is supported by laterally spaced roller bearings 102 that are mounted in the side walls of the housing 81. A differential pinion shaft 103 is carried by the pinion frame 101 and receives two opposed differential pinions 104 which mesh with a pair of differential bevel gears 105 and 106 which are journaled for rotation in suitable recesses of the pinion frame 101. The differential bevel gears 105 and 106 are free to rotate relative to the differential pinion frame 101. The housing 81 carries a flange 107 (Figure 2) which is adapted to be secured, as by bolts 108, over the forwardly facing opening in the axle housing 15. When the combined transmission and differential case 81 is thus fastened in place, the differential unit is disposed entirely within the rear axle housing 15. One advantage of this particular construction is that the quantity of lubricant required for the differential is greatly reduced, since it is necessary only to have the required amount of lubricant in the differential compartment; it is not necessary to fill the entire banjo housing with lubricant up to the level required by the differential unit.

The power is transmitted from the differential unit to two full floating drive shafts 110 and 111 which extend into the differential section of the housing 81 and into and through the bevel gears 105 and 106 of the differential. The inner ends of the axle shafts 110 and 111 are splined, as at 112, and engage companion splines formed in the hubs of the differential gears 105 and 106. The differential pinion frame 101 also receives the inner ends of the full floating drive or axle shafts 110 and 111, permitting both sliding and rotative movement between the axle shafts and the pinion frame 101. A thrust block 113 bears against the inner ends of the axle shafts 110 and 111, and serves to maintain them in substantially fixed spaced relation at all times. The thrust block 113 is provided with a slot 109 through which the differential pinion shaft 103 passes, the slot 109 permitting axial floating movement of the axle shafts. A cover 114 closes the end of the differential compartment and acts to confine a lubricant used to the relatively small compartment, making it unnecessary to fill the entire banjo housing with lubricant, as mentioned above.

The other ends of the axle housing 15 are provided with radially outwardly extending flanges 115, to which are rigidly bolted a pair of abutting cooperative flanges 200 of the final drive housings 116. Each of the final drive housings 116 comprises an upper transverse hollow arm portion 201 (see Figure 1) having an inwardly facing aperture 202 disposed in a fore and aft extending vertical plane (see Figure 6), which is disposed in register with an outwardly facing opening 203 in the adjacent end of the axle housing 15. A depending casing portion 204 is formed integral with the hollow arm portion 201, within which is journaled a wheel axle 117 in a pair of laterally spaced outer and inner roller bearing units 124, carried in the walls of the depending casing portion 204, respectively. A driven gear 119 is fixed, as by splines 120, to the wheel axle 117 within the casing portion 204, each of the bearing units 124 being supported in a bearing cap 205, 206, respectively, which are fixed within suitable openings in the walls of the depending casing 204. The gear 119 is secured on the splined portion 120 of the shaft 117 by means of a bolt 207, which acts through a washer 208 which bears against the inner race of the inner roller bearing 124. The bottom of the casing portion 204 is provided with an oblong opening 210, which faces downwardly and is disposed in a substantially horizontal plane, so that the whole bottom of the casing 204 is open for the purpose of installing or removing the driven gear 119. The opening 210 is normally closed by a detachable cover pan 162, having edge portions which abut the lower edges of the side and end walls of the depending casing 204, and fixed thereto by bolts 211. The lower opening 210 is disposed in a plane near the axle 117, so that the lower periphery of the gear 119 extends below the opening, and the bottom pan 162 is formed with a depending wall portion 212, which is shaped to receive the lower periphery of the gear 119 and to hold a quantity of suitable lubricant for the gear.

A drive gear or pinion 121 is disposed in the upper portion of the final drive housing 116 in mesh with the driven gear 119 and is formed integral with a shaft 133, journaled on opposite sides of the gear 121 in a pair of roller bearing units 123. The outer bearing 123 is carried in a recess 213 in the outer wall of the final drive housing 116, while the inner bearing unit 123 is mounted in a collar 214, which is appropriately seated within the housing.

The drive shafts 122 at opposite sides of the tractor are connected with the associated axle shaft 110, 111 by means of coupling members 125, each coupling member comprising a hub which is internally splined and has a tight engagement with splines 126 on the drive gear shaft 122 associated therewith, and a sliding engagement with splines 127 that are formed on the outer end of the associated axle shaft 110, 111. Sufficient clearance is provided between the ends of the axle shafts and the associated drive gear shafts 122 so that the rear axle shafts are full floating, that is to say, they are free to slide transversely within the splined hubs 125 and also within the splined differential gears 105, 106. Each of the shafts 110, 111 is urged inwardly into contact with the thrust block 113 by means of a compression spring 128, which acts against the shoulder 129 on the associated axle shaft and reacts against the inner end of the hub of the coupling member 125. Thus the springs 128 also serve to hold the coupling members 125 in secure engagement with the splined drive gear shaft 122. A spacer sleeve 130 embraces the shaft 122 between the inner bearing unit 123 and the hub 125. Thus it is evident that both of the rear axles 110, 111 together with the thrust block 113, are freely movable axially as a unit, and these parts are centered by the compression springs 128. By virtue of this construction, stresses due to structural distortion of the tractor frame are not transmitted to the differential gears or the associated bearings.

It will be noted that each of the parts in the final drive housings 116 are readily accessible for purposes of disassembly and assembly. The driven gear 119 is easily removed from the final drive housing without dismounting the latter by first removing the bottom cover 162 or pan and the inner bearing cover 206, after which the securing bolt 207 and washer 208 are removed from the end of the wheel axle 117, permitting the inner bearing unit 124 to be withdrawn through the opening in the inner wall of the lower casing portion 204. The wheel axle 117 can then be withdrawn outwardly from the housing, which frees the driven gear 119, permitting the latter to drop through the bottom opening 210 in the housing 116. By unbolting the flanges 115, 200, the entire final drive housing 116 can be dismounted, and due to the sliding connection between the splined end 127 of each of the shafts 110, 111, the coupling member 125 can be withdrawn together with the housing 116. Inasmuch as the coupling member 125 is adjacent the aperture 202, it is easily accessible after the final drive housing has been dismounted, and can be withdrawn from the shaft 122 through the aperture 202. The bearing retaining collar 214 can then be removed, after which the shaft 122 and gear 121, together with the bearings 123 can be removed from the housing 116 through the aperture 202.

Figure 7:
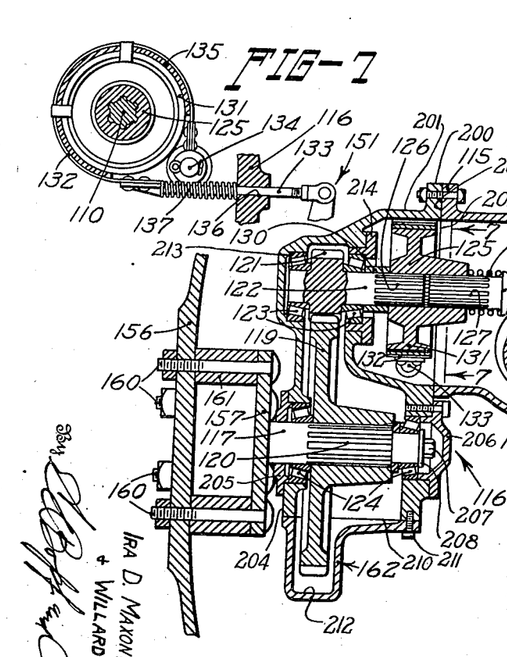
Figure 7 is a fragmentary section taken along the line 7—7 of Figure 6.

Each of the coupling members 125 is provided with a brake drum 131 integrally formed therewith, and surrounding each brake drum is a brake band 132 that is adapted to be contracted by the action of the brake rod 133 connected to the band at one end. The other end of the brake band is held against movement by an anchor pin 134 that is carried by the associated final drive housing 116. The brake band 132 is faced with a suitable lining 135, and the brake rod extends forwardly through an aperture 136 in the wall of the final drive housing 116. A compression spring 137 moves the brake band out of contact with the drum when pressure is removed therefrom, as best indicated in Figure 7.

The brakes are operated by means of two brake pedals 140 and 141 which are pivotally connected to the right hand frame member 10 immediately forward of the foot-rest platform 36. The pedal faces are disposed close together so that both may be operated at the same time by the operator's right foot engaging both of them, or they may be separately operated, as when it is desired to make a sharp turn, say at the end of a row when planting or cultivating, by the operator shifting his foot to the pedal desired. The pedal shanks 140', 141' extend downwardly flush with the inner adjacent ends of the pedal faces, in order that when one of the pedals is depressed, the operator's foot cannot catch under the other pedal. A tie rod 142 is pivoted at its forward end to the pedal 140 controlling the left brake, and the tie rod 142 extends rearwardly to a lever arm 144 on the right hand end of a transversely extending rock shaft 145. A second tie rod 143 is pivoted to the right hand brake pedal 141 and extends rearwardly and is pivoted to a lever arm 146 on a rock shaft 147. Both rock shafts are supported by the tubular frame members 9 and 10 through suitable hangers 150. At the left end of the rock shaft 145, a lever arm 151 connects with the brake rod 133 to actuate the left wheel brake. At the right end of the other rock shaft 147, a lever arm 152 connects with the brake rod 133 of the right wheel brake to actuate the latter.

The rear traction wheels are each indicated at 155, and each includes a wheel disc 156 that is held on the flange 157 of the wheel axle 117 by a plurality of bolts 160. The wheel tread of the tractor is made adjustable by means of spacers 161 disposed between the wheel disc 156 and the wheel receiving flange 157. By using spacers of various sizes, any suitable adjustment may be effected. However, the spacers 161 shown in Figure 6 are especially adapted for use with the rear wheels when it is desired to align the inside edges of the rear wheels with the inside edges of the front wheels. When the spacers 161 are removed and the wheel disc 156 clamped directly to the wheel receiving flange 157, the outside edges of the front and rear wheels are brought into alignment.

Figure 8:
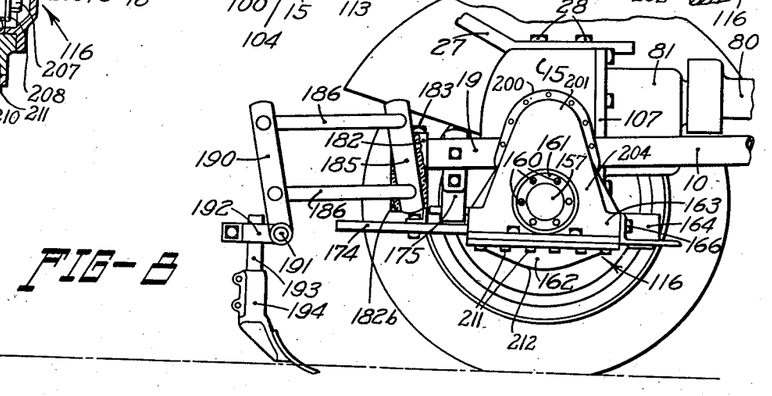
Figure 8 is a side view of the rear end of the tractor with a cultivator rig attached to the rear ends of the tubular frame members, the near traction wheel being removed in order to show the parts with more clarity.

Preferably, although not necessarily, the tractor drawbar and associated parts receive draft from the tractor through suitable connections with the lower portions of the final drive housings. As best shown in Figure 8, a boss 163 having a vertical transverse face is formed on the lower front portion of each of the final drive housings 116, and bolted to the bosses 163 is a transversely extending draft tongue frame member 164 which is constructed of angle iron that is bowed slightly forward through the middle section for additional rigidity, and has laterally disposed slots 165 at its ends. Bolts 166 are passed through the slots 165 and screwed into threaded holes in the bosses 163, as best indicated in Figure 3. A U-shaped member 170 is welded to the back side of the member 164 at its midpoint, as best shown in Figure 2, and the arms of the member 170 are apertured to receive a transverse pivot bolt 171 that receives a strap 172 which is carried by a draft tongue 174 by means of a vertical pivot bolt 173. The strap 172 and the two pivot bolts 171 and 173 provide a universal shackle connection between the draft tongue 174 and the transverse draft member 164. The rear end of the draft tongue or drawbar 174 is supported on a U-shaped hanger 175, the drawbar 174 having a roller 176 carried between two brackets 180 that are bolted to the draft tongue and disposed on opposite sides fore and aft of the hanger 175. The upturned ends 181 of the hanger 175 are bolted to the rear portions 19 and 20 of the tubular frame members 9 and 10.

When an implement is drawn by the draft tongue 174, the bar 164 tends to bow in the direction of the applied force, which usually tends to draw the ends of the bar in toward the center. If the ends were rigidly connected to the final drive housings 116, the ends will tend to draw that portion of the housing inwardly toward the center and thereby throw the final drive gears and shafts out of alignment. However, by virtue of the above described slotted connection between the outer ends of the transverse bar 164 and the drive housings, the ends of the bar are free to slide endwise when deflected without forcing the drive housings out of their proper position.

The tractor shown in the drawings and described above is adapted to receive various forms of cultivating and other operating units. In Figures 1 and 8, a cultivator rig is shown as attached to the rear portion of the tractor frame. Each cultivator rig unit is indicated by the reference character C, and each unit is mounted on a transversely extending bar 182 that is disposed across the top of and carried by the rear ends of the tubular frame members 9 and 10 at the rear portions 19 and 20 thereof, as best shown in Figure 1. Two or more bolts 183 secure the bar 182 in place. The lateral ends of the bar 182 are extended downwardly on the outside of the frame bars 19 and 20, as indicated at 182a and 182b in Figure 1, and a member 185 is secured to the outside surface of each of these downwardly bent ends, each member 185 being inclined slightly to the rear, as best shown in Figure 8. The upper and lower end portions of each bar 185 are apertured to pivotally receive the forward ends of two rearwardly extending parallel rods 186, the rear ends of which are pivotally connected to a member 190 that is parallel to the associated member 185. A horizontal arm 191 extends laterally outwardly from the lower end of each of the members 190, and to each arm 191 a tool shank clamp 192 is fixed. Each clamp 192 receives a tool shank 193 and the attached cultivator shovel or other tool 194. By virtue of the parallel link mounting for each cultivator unit C, the cultivator tools 194 are constrained for generally vertical movement into various parallel positions.

One or more additional brackets 195 may be welded to the tubular frame members 9 and 10 to receive and support additional implements, the brackets 195 being shown in Figure 1 as mounted forwardly of the foot rest platforms 35 and 36.

While we have shown and described above the preferred structure in which the principles of the present invention have been embodied, it is to be understood that our invention is not to be limited to the specific details shown and described above, but that, in fact, widely different means may be employed in the practice of the broader aspects of our invention. For example, we have described a number of parts as being castings, and while we prefer to use castings it is to be understood that these parts may be formed in any suitable manner.

What we claim, therefore, and desire to secure by Letters Patent is:

1. In a tractor, the combination of an axle housing having an opening, a transmission and differential housing having an outwardly disposed flange adapted to fit over the opening in said axle housing, said transmission and differential housing including a transmission compartment and a differential compartment, and means for securing said flange to said axle housing with the differential compartment disposed within the axle housing.

2. In a tractor, the combination of an axle housing of the banjo type having axle shafts and bearing means supporting the outer ends of said axle shafts on the outer portions of said axle housing, a unitary transmission and differential housing having a transmission compartment and a differential compartment adapted to be received within said axle housing for alignment with and connection to the inner ends of said axle shafts, and means for connecting the transmission and differential housing to said axle housing so as to secure and maintain the differential compartment of said transmission and differential housing in aligned position with respect to said axle shafts.

3. In a tractor, the combination of a banjo type axle housing having an opening in the front wall thereof, a differential housing containing differential gear mechanism journaled therein, said differential housing being adapted to be inserted through said opening into said axle housing to be completely enclosed thereby, flange means extending outwardly on said differential housing for closing said opening, bolt means extending through aligned openings in said flange and axle housing for securing said differential housing rigidly to said axle housing, a pair of axle shafts supported at their inner ends in said differential housing, and means supporting the outer ends of said shafts at the outer ends of said axle housing, respectively.

4. In a tractor, the combination of a banjo type axle housing having an opening in the front wall thereof, a transmission housing and a differential housing rigidly fixed together, a wall between said housings extending outwardly to provide a supporting flange overlapping said axle housing around said opening, bolt means extending through openings in said flange and engaging threaded recesses in said axle housing for securing said supporting flange to said axle housing for closing said opening, said differential housing extending into said axle housing and completely enclosed thereby and totally carried on said supporting flange, said transmission housing extending forwardly from its support on said flange.

5. In a tractor, a rear axle housing, traction wheels journaled at the outer ends of said housing, means for driving each of the wheels including a drive shaft, a pair of axle shafts disposed in said axle housing in axial alignment with said wheel drive shafts, the adjacent ends of said shafts being splined, a pair of couplings transmitting power from said axle shafts to said drive shafts, each of said couplings comprising an internally splined hub receiving the adjacent ends of the associated axle shaft and drive shaft in opposite ends, respectively, and a pair of brake elements mounted on said hubs, respectively.

6. In a tractor, a rear axle housing, a differential unit journaled for rotation therein and including a pair of differential gears, a pair of axle shafts journaled for rotation in said rear axle housing and slidingly connected for rotation by said differential gears, drive wheels journaled at the outer ends of said axle housing, means for driving each of said wheels including a shaft disposed in axial alignment with the associated axle shaft, the adjacent ends of said shafts being splined, and a pair of brake drums, each having an internally splined hub fixed to the associated wheel driving shaft and slidably but non-rotatably receiving the outer splined end of the associated axle shaft.

7. In a tractor, a rear axle housing, a differential unit journaled for rotation therein and including a pair of differential gears having splined hubs, a pair of axle shafts having splined inner ends adapted to slidably fit into said splined hubs for rotation by said differential gears, traction wheels journaled at the outer ends of said axle housing, means for driving each of said wheels including a drive shaft disposed in axial alignment with the outer end of each of said axles, an anti-friction type bearing for supporting each drive shaft, a coupling member slidably receiving the adjacent ends of each of the associated drive and axle shafts and having means engaging said bearing, and a pair of springs acting against said axle shafts, respectively, and reacting through said coupling members against said bearings, tending to urge said axle shafts inwardly of said differential unit and also to hold said coupling members in proper position.

8. In a tractor, a rear axle housing, a differential unit journaled for rotation therein and including a pair of differential gears having splined hubs, a pair of axle shafts having splined inner ends adapted to slidably fit into said splined hubs for rotation by said differential gears, traction wheels journaled at the outer ends of said axle housing, means for driving each of said wheels including a drive shaft disposed in axial alignment with the outer end of each of said axles, an anti-friction type bearing for supporting each drive shaft, a coupling member slidably receiving the adjacent ends of each of the associated drive and axle shafts and engaging said bearing, a pair of springs acting against said axle shafts, respectively, and reacting through said coupling members against said bearing, tending to urge said axle shafts inwardly of said differential unit and also to hold said hubs in place, and a thrust block disposed between said differential gears and the inner ends of said axle shafts for limiting their inward movement under the influence of said springs.

9. In a tractor, a rear axle housing, a differential unit journaled for rotation therein and including a pair of differential gears having splined hubs, a pair of axle shafts having splined inner ends adapted to slidably fit into said splined hubs for rotation by said differential gears, traction wheels journaled at the outer ends of said axle housing, means for driving each of said wheels including a drive shaft disposed in axial alignment with the outer end of each of said axles, the adjacent ends of said shafts being splined, a pair of coupling members, each comprising an internally splined hub slidably receiving the adjacent ends of each of the associated drive and axle shafts in opposite ends, respectively, and a brake element encircling said coupling member, and a pair of springs acting against said axle shafts, respectively, and reacting against said coupling members, tending to urge said axle shafts inwardly and said coupling members outwardly of said differential unit.

10. In a tractor, a rear axle housing, a differential unit journaled for rotation therein and including a pair of differential gears having splined hubs, a pair of axle shafts having splined inner ends adapted to slidably fit into said splined hubs for rotation by said differential gears, traction wheels journaled at the outer ends of said axle housing, means for driving each of said wheels including a drive shaft disposed in axial alignment with the outer end of each of said axles, the adjacent ends of said shafts being splined, an antifriction type bearing in which said drive shaft is journaled, a pair of coupling members, each comprising an internally splined hub slidably receiving the adjacent ends of each of the associated drive and axle shafts in opposite ends, respectively, and having means engaging said bearing, and a brake element mounted on each of said coupling members for selectively braking each of said wheels through the latter, and a pair of springs acting against said axle shafts to urge the latter inwardly in opposed relation, and reacting outwardly against said coupling members, the latter transmitting the outward thrust to said bearings.

11. In a tractor having a banjo type rear drive housing enclosing differential gears, a pair of final drive housings on opposite sides of said rear housing having apertures in their sides adjacent said rear housing, a bolting flange extending outwardly from each of said apertures for securing said housings to said rear housing with said apertures in register with openings in opposite sides of the rear housing, respectively, a traction wheel journaled on each of said final drive housings, means for driving each of said wheels including a short drive shaft rotatably disposed in said final drive housing and having a splined inner end, an antifriction type bearing in which said drive shaft is journaled, a pair of axle shafts having splined inner ends slidably mounted in said differential gears and splined outer ends disposed adjacent to and in alignment with said splined inner ends of said drive shafts, a coupling member including an internally splined hub slidably engaging the adjacent ends of said aligned shafts and having means engaging said bearing, and spring means acting against said axle shafts to urge the latter inwardly and reacting through said hubs against said bearings to hold the hubs and said axle shafts in proper position after the final drive housings are secured to said rear housing.

12. The combination set forth in claim 11, including the further provision of brake drums carried rigidly on said coupling members.

IRA D. MAXON.
WILLARD H. NORDENSON.
MAX SKLOVSKY.